US007008001B1

(12) United States Patent
Reynolds

(10) Patent No.: US 7,008,001 B1
(45) Date of Patent: Mar. 7, 2006

(54) AUTOMATIC TARPER

(76) Inventor: James F. Reynolds, 523 Maple Ridge Rd., Harrison, ME (US) 04040

( * ) Notice: Subject to any disclaimer, the term of this patent is extended or adjusted under 35 U.S.C. 154(b) by 0 days.

(21) Appl. No.: 10/924,352

(22) Filed: Aug. 23, 2004

(51) Int. Cl.
*B60P 7/02* (2006.01)

(52) U.S. Cl. ......................... 296/101; 296/98; 220/908

(58) Field of Classification Search ................. 296/101
See application file for complete search history.

(56) References Cited

U.S. PATENT DOCUMENTS

| | | | | | |
|---|---|---|---|---|---|
| 3,460,602 | A | | 8/1969 | Hugus | |
| 3,636,656 | A | * | 1/1972 | Dennis | 49/40 |
| 4,024,806 | A | * | 5/1977 | Weeks et al. | 100/52 |
| D250,691 | S | * | 1/1979 | Horpestad | D34/3 |
| 4,155,297 | A | * | 5/1979 | Smith et al. | 100/52 |
| 4,230,359 | A | * | 10/1980 | Smith | 296/101 |
| 4,542,931 | A | * | 9/1985 | Walker, Jr. | 296/101 |
| 4,585,266 | A | * | 4/1986 | Steinberg | 296/101 |
| 4,659,134 | A | | 4/1987 | Johnson | |
| 4,691,957 | A | | 9/1987 | Ellingson | |
| 4,860,813 | A | | 8/1989 | Ballyns et al. | |
| 4,872,801 | A | * | 10/1989 | Yeazel et al. | 414/409 |
| 4,886,411 | A | * | 12/1989 | Pieperhoff et al. | 296/99.1 |
| 4,944,551 | A | * | 7/1990 | Hardy, Jr. | 296/100.12 |
| 5,058,957 | A | * | 10/1991 | Fell | 298/24 |
| 5,248,057 | A | * | 9/1993 | Taylor | 220/908 |
| 5,277,536 | A | * | 1/1994 | Baldwin et al. | 414/409 |
| 5,752,735 | A | * | 5/1998 | Fleming et al. | 296/98 |
| 5,829,818 | A | * | 11/1998 | O'Daniel | 296/98 |
| 5,924,758 | A | | 7/1999 | Dimmer et al. | |
| 5,957,523 | A | | 9/1999 | Haddad, Jr. | |
| 5,988,972 | A | * | 11/1999 | Boivin | 296/37.6 |
| 6,155,326 | A | | 12/2000 | Imhoff et al. | |
| 6,237,985 | B1 | * | 5/2001 | O'Brian | 296/98 |
| 6,276,744 | B1 | | 8/2001 | Huber et al. | |
| 6,412,406 | B1 | | 7/2002 | Flood et al. | |
| 6,457,622 | B1 | * | 10/2002 | Henning | 267/272 |
| 6,578,897 | B1 | * | 6/2003 | White | 296/98 |
| 6,589,002 | B1 | * | 7/2003 | Sumpter | 414/400 |
| 6,685,251 | B1 | | 2/2004 | Dumas | |
| 6,722,416 | B1 | | 4/2004 | Varley et al. | |
| 6,808,080 | B1 | * | 10/2004 | Spiers et al. | 220/908 |
| 2002/0139493 | A1 | | 10/2002 | Brown | |
| 2002/0140248 | A1 | | 10/2002 | White | |
| 2002/0145304 | A1 | | 10/2002 | Henning | |

* cited by examiner

Primary Examiner—Kiran B. Patel
(74) *Attorney, Agent, or Firm*—Patricia M. Mathers; Thomas L. Bohan

(57) ABSTRACT

A tarping system that automatically covers and prevents trash from spilling from a trash opening in the rear vertical panel of a CRC. The tarping system automatically draws a tarp from the lower edges of the trash opening up over the opening, effectively closing the opening completely. The lower edges of the tarp are secured around the lower side edges and bottom edge of the trash opening of the CRC and the upper edges are secured to a tarping bar. The tarping bar is spring-biased to automatically swing upward when the CRC is moved away from a trash compactor site, in the process collecting any trash that spills from the trash opening and preventing trash from slipping from the CRC at the bottom of the tarp.

13 Claims, 4 Drawing Sheets

AUTOMATIC TARPER

BACKGROUND INFORMATION

1. Field of the Invention

The present invention relates to the field of trash containers. More particularly, the invention relates to tarps for securing the trash-receiving opening in the rear of a trash container.

2. Description of the Prior Art

A compactor receiver container (CRC) is a trash container that receives compacted trash. The CRC has an opening in the rear vertical container panel and is otherwise enclosed. Large stores, for example, typically have a trash collection site that includes a trash compactor installed in a trash disposal room and a CRC stationed to receive trash directly from the compactor. The CRC, once filled, is towed away by a tow vehicle to a waste disposasl site for emptying and then returned to the trash collection site.

A frequent nuisance when moving the CRC away from the trash collection site is that trash falls out of the opening onto the ground. The typical CRC removal procedure thus includes multiple steps: the driver of the tow vehicle first moves the CRC away from the wall, then gets out, picks up trash that has fallen onto the ground, and finally manually secures a tarp over the opening. The tarp is secured by elastic cords, rope, or the like. Having to clean up trash from the ground is an avoidable waste of time. Furthermore, it can take considerable time and effort for a single person to secure the tarp over the opening of an overfilled CRC. A further disadvantage of the current practice is that the cords securing the tarp may fray and/or break, with trash then spilling out onto the ground during transit to the waste disposal site.

In an effort to simplify the process of securing the trash opening in the CRC, Brown (U.S. Patent Appl. Pub. 2002/0139493) devised a spring-loaded tarp assembly for covering the trash opening of a CRC, which makes it easier for the operator to secure a tarp over the trash opening. A disadvantage of this tarp assembly is that the tarp must be manually lowered and secured by the operator. Another disadvantage is that the tarp is pulled from the upper edge of the trash opening downward, to be secured at the lower edge of the CRC. This does not eliminate the problem of trash spilling from the trash opening as the tarp is pulled down. Furthermore, due to the force of gravity, trash in an overfilled CRC will tend to work its way out of the CRC at the bottom of the tarp, even when it is properly secured.

A further nuisance related to the use of the CRC is that once it is transported away from the trash collection site, there is often nowhere to put trash that spilled out of the CRC. When the CRC is picked up for emptying, it is typically not replaced with another one at that time. Rather, the CRC is brought to the waste disposal site and then returned to the trash collection site. If someone does go out and pick up any spillage, there is no CRC or other large container available for stowing the trash until the CRC is returned. As a result, the spillage is quite often left to blow around the parking lot until the empty CRC is returned.

What is needed, therefore, is a tarping system for a CRC that does not require manual intervention by the operator of the trash tow vehicle. What is further needed is such a device that automatically covers the trash opening when the CRC is moved away from a wall. What is yet further needed is such a device that prevents trash from falling from the CRC onto the ground, even when the opening in the CRC is not fully covered.

BRIEF SUMMARY OF THE INVENTION

For the reasons stated above, it is an object of the present invention to provide a tarping system for a CRC that automatically covers the trash opening in the CRC when it is moved away from a wall. It is a further object to provide such a device that prevents trash from falling from the CRC on the ground, even when the trash opening in the CRC is not fully covered.

The objects of the invention are achieved by providing a tarping system that automatically swings a tarp over the trash opening of a CRC, from the bottom up, when the CRC is moved away from a wall. The term "CRC" as used hereinafter includes both 40-yard and 100-yard trash containers, the key feature of the CRC being that the trash opening is in the rear of the container and not on the top. The tarping system according to the invention comprises a tarp, tarping bar, and an actuating means. One end of the tarp is secured to the bottom of the trash opening of the CRC and the other end attached to the tarping bar. When in the "open" mode, the tarping bar is held in an open position against or in the vicinity of the lower edge of the opening; in a "closed" mode, the tarping bar is held in a closed position against the rear panel above the upper edge of the trash opening. With the tarping bar in the open position, the tarp is folded or pleated between the tarping bar and the rear panel of the CRC; with the bar in the closed position, the tarp is unfolded and pulled upward to cover the entire trash opening of the CRC.

The tarping system according to the invention encompasses at least two embodiments; one that is strictly mechanical in operation and one that is power-assisted. Electromechanical, electromagnetic, hydraulic, or pneumatic devices may provide the power assistance. In the mechanical embodiment, the actuating means for moving the tarping bar between the open and closed positions is a spring-loaded tension assembly comprising a tension spring attached at one end to a cable and at the other end to a pivot end of the tarping bar. The pivot end of the tarping bar is pivotably mounted on a pivot pin that is attached to the rear panel of the CRC, near a side edge of the trash opening. The actuating means in this mechanical embodiment is a tensioner that applies tension to the tension spring, which then forces the tarping bar to swing about the pivot pin through a semicircular arc, from its open position in which the tarping bar is positioned at or near the lower edge of the trash opening to the closed position, in which the tarping bar is positioned at or near the upper edge of the trash opening.

The tarp itself is attached to the rear panel of the CRC, around the lower half of the trash opening, and to the tarping bar. The contour of the tarp is such that it has sufficient fabric to allow the tarping bar to swing through a full semicircular arc from the open position to the closed position, to completely cover the trash opening.

When the CRC is in position for receiving compacted trash from the trash compactor, the tarping bar is held in the open position, without any tension on the spring, of a safety chain or other retaining means. Before moving the CRC away from the compactor, the safety chain or other retaining means is released. The tensioner is moved to a position that applies tension to the spring, which biases the tarping bar to move upward. The CRC is then moved away from the compactor site by the tow vehicle. As the CRC moves away from the compactor site and the tarping bar is free to move upward, the tension spring pulls the end of the tarping bar about its pivot pin, forcing the tarping bar upward into the closed position and thereby automatically pulling the tarp upward over the trash opening. Once in the closed position, the tarping bar may be secured against the rear panel of the CRC by means of safety chains, elastic shock cords, or other means, to prevent the bar from being jostled open in transit. Additionally, a lock is included that locks the tarping bar in the down or "open" position to prevent the bar from accidentally snapping up.

This mechanical embodiment of the tarping system is particularly advantageous for several reasons. The spring force can be very fast-acting, so as to snap the tarping bar up toward the closed position within a very brief span of time. This is desirable, because the faster the trash opening is closed, the less able trash is able to spill. Also, the tarping system requires no power source, other than the force exerted to apply tension to the spring. This is advantageous because the CRC itself does not have a power source. Because the CRC is not always returned to the same trash collection site, and some trash collection sites do not have the means to provide a power, it would require some logistical effort to ensure that a CRC with a power-assisted tarping system is not placed at a trash collection site that has no means of providing power.

In a power-assisted tarping system, the power-assists may include hydraulic, pneumatic, and/or electromagnetic means for moving the tarping bar. In such an embodiment, the actuating means includes a control module or power switch, ideally located on the rear panel of the CRC, and a power-assist unit, such as an electric motor with winch, or hydraulic unit with piston and cylinder.

BRIEF DESCRIPTION OF THE DRAWINGS

The present invention is described with reference to the accompanying drawings. In the drawings, like reference numbers indicate identical or functionally similar elements.

DETAILED DESCRIPTION OF THE INVENTION

Figure 1:
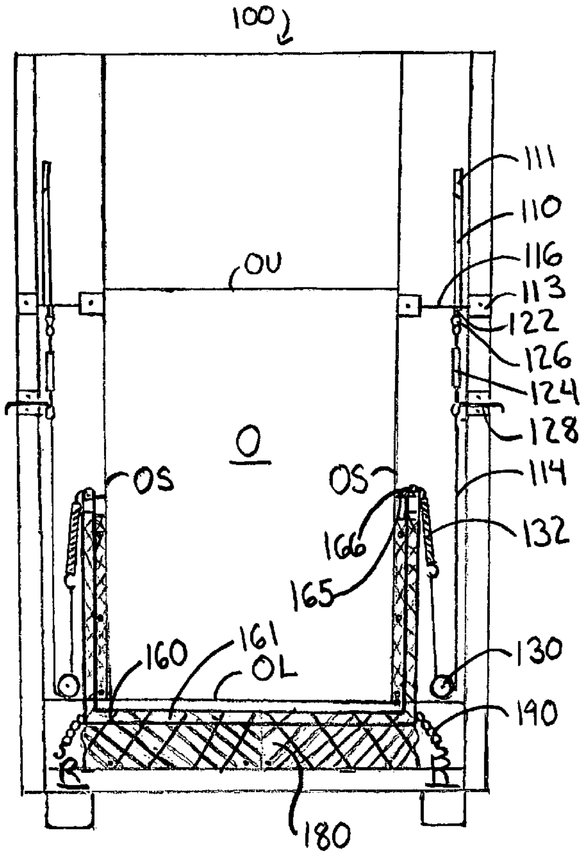
FIG. 1 is a front view of the preferred embodiment of the automatic tarper according to the invention, showing the automatic tarper in its open position.
Figure 2:
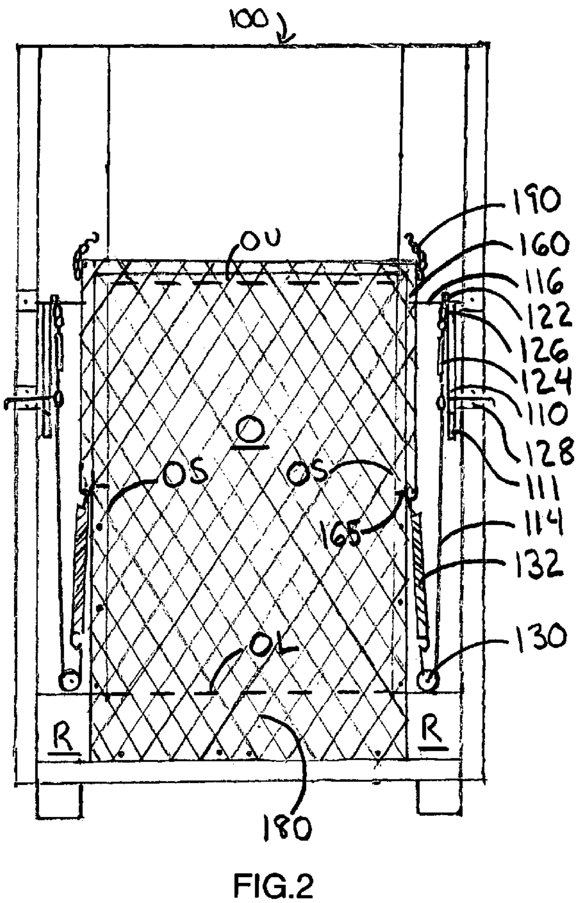
FIG. 2 is a front view of the automatic tarper of FIG. 1, showing the automatic tarper in its closed position.

FIGS. 1 and 2 illustrate a preferred embodiment of an automatic tarper 100 according to the invention for automatically covering a trash opening O in a CRC C. FIG. 1 shows an open position of the automatic tarper 100 and FIG. 2 a closed position. The trash opening O is located in the rear vertical panel of the CRC and has a lower edge $O_L$, an upper edge $O_U$, and side edges $O_S$. The automatic tarper 100 comprises an actuating assembly 110, a tarping bar 160, and a tarp 180. The tarp is generally depicted with cross-hatching. In the embodiment shown, the actuating assembly 110 is mounted on each side of the trash opening O, with the two assemblies being the mirror reverse of each other. When the automatic tarper 100 is in the open position, the tarping bar 160 is positioned slightly below the lower edge $O_L$ and along the lower portions of the side edges $O_S$ and is spring-biased to spring upward to the closed position. In the closed position, the tarping bar 160 is positioned above or near the upper edge $O_U$ of the trash opening O. When moving to the closed position, the tarping bar 160 pulls the tarp up over the trash opening O.

The actuating assembly 110 comprises a tension spring 132, but in the embodiment shown, the assembly includes an actuator 111, a tensioner bar 116, and a tension assembly 112, which includes the tension spring 132. The actuator 100, in this preferred embodiment, is a simple lever that is fixedly connected to the tensioner bar 116, which is rotatably mounted on the rear panel of the CRC C with mounting brackets 113. The tension assembly 112 includes a tension cable 114, a tension spring 132, and an adjustment means 120. One end of the tension cable 114 is fixedly attached to the adjustment means 120 and the other end to the tension spring 132. The adjustment means 120 is connected to the tensioner bar 116 via a swing bar 122 that is fixedly attached to the tensioner bar 116. The adjustment means 120 in this embodiment includes a turnbuckle 126 that is connected at one end to the swing bar 122 via a shackle 124 and at the other end to the tension cable 114.

FIG. 1 also illustrates the attachment of the tension spring 132 to the tarping bar 160. The tarping bar 160 is U-shaped, with side arms 162 and a horizontal bar 161 therebetween. Each side arm 162 is pivotably mounted to a pivot bar 165 that is fixedly mounted on the side edge $O_S$ of the CRC C at a pivot point 166. A pivot end 164 of the side arm 162 extends beyond the pivot pivot point 166 and has an eye for receiving a fastening means 143 of the tension spring 132. In the embodiment shown, the fastening means 143 is a hook. When tension is applied to the tension spring 132, it exerts a downward force on the pivot end 164, biasing the tarping bar 160 to the closed position.

Tension is applied to the tension spring 132 by rotating the lever 111 from a tension release position, shown in FIG. 1, downward to a biasing position, shown in FIG. 2. This swings the swing bar 122 approximately 180 degrees about the axis of the tensioner bar to its biasing position in which a pull is exerted on the tension cable 114 and on the pivot end 164, which in turn biases the tarping bar 160 to move to the closed position.

Several safety features are incorporated into the automatic tarper 100. A tension lock 128 is provided, to lock the tension assembly 112 into the open or biased position. In the embodiment shown, the tension lock 128 is a simple bar that prevents the tarping bar 160 from swing outward. A safety chain 190 is attached to the horizontal bar 161. This chain may be attached to the CRC C to prevent the tarping bar 160 from moving toward the closed position and may also be attached to the upper edge $O_U$, when the CRC is being readied for transit, to secure the tarping bar 160 in the closed position. Eyes for receiving hooks are generally provided along the upper edge $O_U$ of the conventional CRC and a simple, effective means of securing the tarping bar 160 for transit is to hook the safety chain 190 to one of the eyes.

Figure 3:
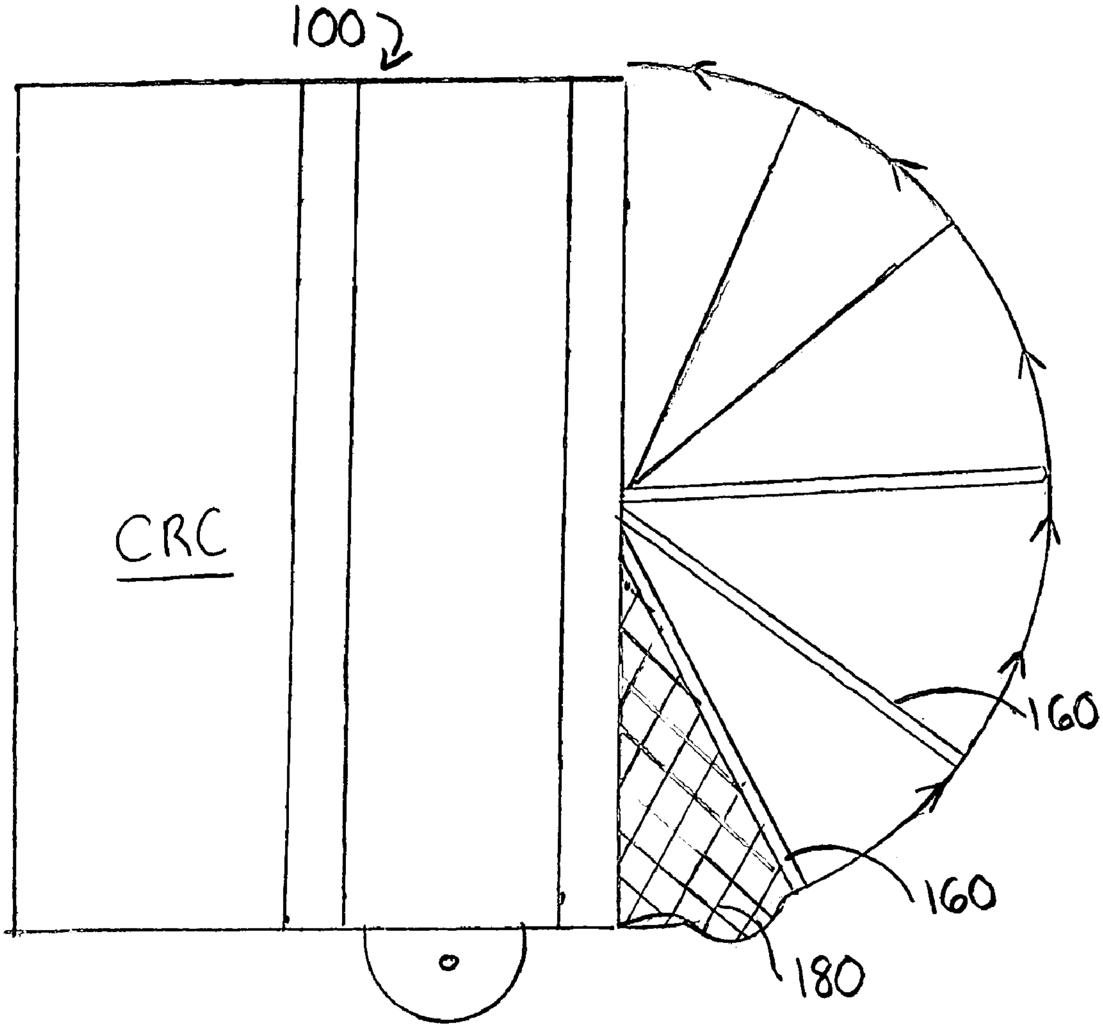
FIG. 3 is an illustration of the automatic tarper of FIG. 1 as it moves from the open position to the closed position.

FIG. 3 is a side view of the automatic tarper 100, illustrating the motion of the tarping bar 160, as the CRC C is pulled away from the trash compactor site. As shown, the tarp 180 is attached to a bottom edge of the CRC C and to the lower half of the side edges of the trash opening O. As the tarping bar 160 swings upward approximately 180 degrees, it pulls the tarp 180 up over the rear panel of the CRC C, thereby closing the trash opening O. Conventional CRCs have a recessed area R on the rear panel, shown in FIGS. 1 and 2. In the embodiment shown, the actuating and tensioning components of the automatic tarper 100 are installed in this recess R.

Figure 4:
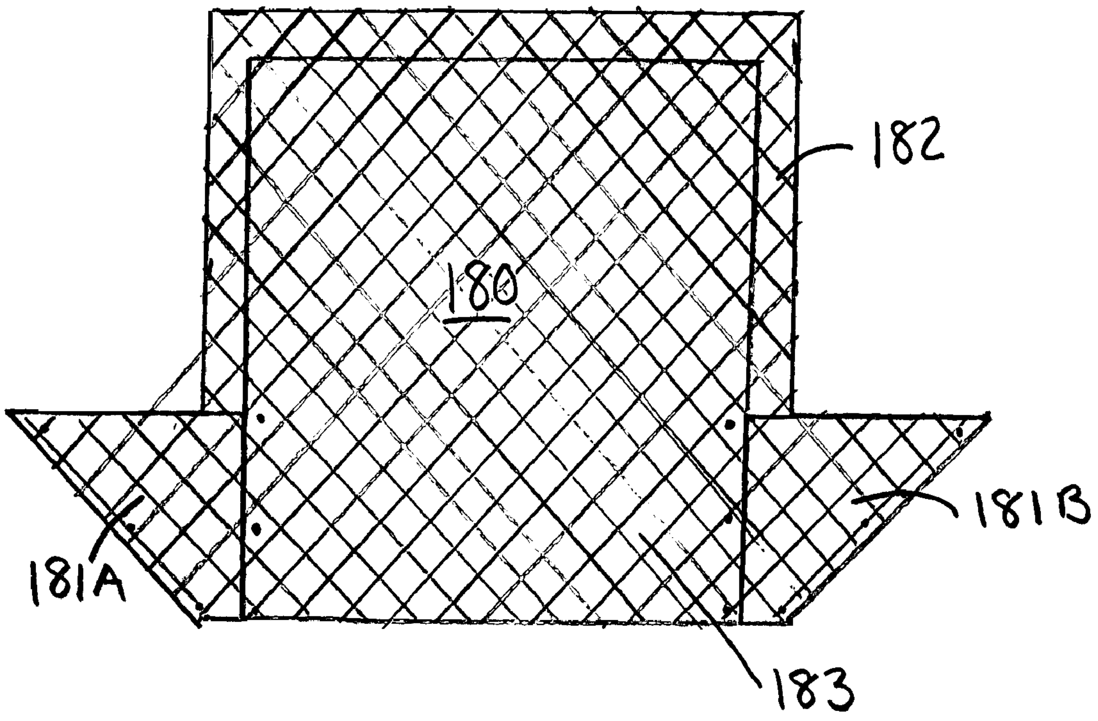
FIG. 4 is a front view of a tarp of the automatic tarper according to the invention.

FIG. 4 is a front view of the tarp 180. The tarp 180 includes a main section 182, two side sections 181A, 181B and a sleeve 182. The side sections 181A, 181B are triangular shaped pieces having an extra width at the top edge that corresponds to the length of one of the side arms 162. The sleeve 182 is constructed to fit over the side arms 162 and the horizontal bar 162, leaving the pivot ends 164 of the side arms 162 free. The bottom edge of the main section 183 is affixed to the lower edge $O_L$ and the side sections 181A, 181B are affixed to the lower halves of the two side edges $O_S$. The top edge of the side sections 181A, 181B have an extra width that is dimensioned such that the tarping bar 160 is able to swing through a full semicircular arc. Any suitable means may be used to affix the main section 183 and side sections 181A, 181B to the edges of the trash opening O, such as rivets, adhesive means, hook-and-loop fastener strips, hooks and eyes, snap fasteners, clamps, or any combination thereof.

FIGS. 1–4 illustrate the various components of the preferred embodiment of the automatic tarper 100. Ideally, the components are incorporated into a pre-assembled unit that is mounted in the recess R as a single unit, with essentially only the tarping bar 160 extending out beyond the recess. The pre-assembled unit simplifies installation of the tarping bar 160, as it eliminates the need to measure carefully the specific mounting locations of the various components on the CRC C.

Figure 5:
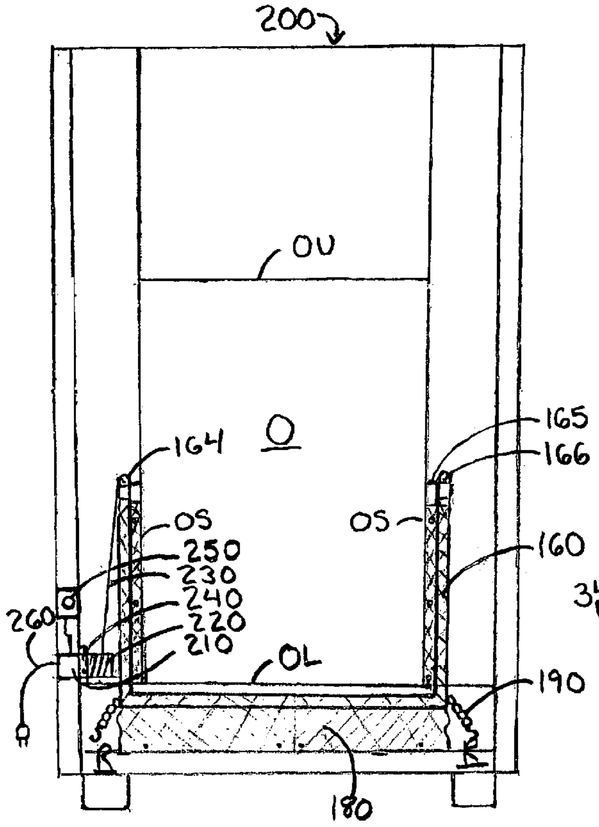
FIG. 5 is a front view of a second embodiment of the automatic tarper according to the invention.

FIG. 5 illustrates a second embodiment of the invention that is a winch-operated automatic tarper 200. The automatic tarper 200 comprises an electrical actuating assembly 210, the tarping bar 160 and the tarp 180. The actuating assembly 210 includes a winch 220 with a cable 230, a motor 240, a switch or control module 250 and a power cord 260 for connecting to an external energy source. The cable 230 is attached to the pivot end 164 of the side arm 162 of the tarping bar 160. To raise the tarping bar 160 to the closed position, the switch 250 is actuated and the the motor 240 energized. The winch 220 turns, shortening the length of the cable 230 and thereby forcing the tarping bar 160 to pivot about the pivot point 165. Ideally, the electric actuating assembly 210 is mounted at the rear of the CRC C and is actuated while the operator has the automatic tarper 200 in view, to ensure that it is not actuated while persons are working in the area.

Figure 6:
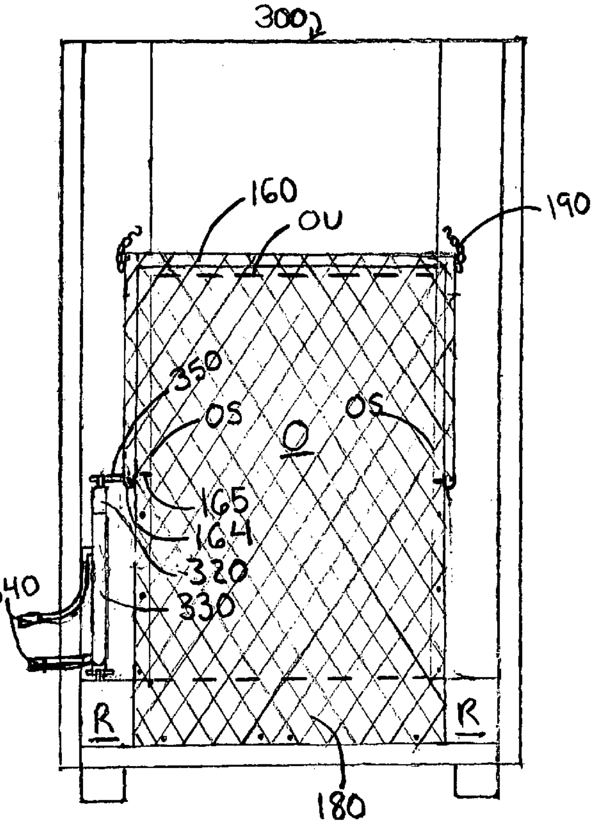
FIG. 6 is a front view of a third embodiment of the automatic tarper according to the invention.

FIG. 6 illustrates a third embodiment of the invention that is a hydraulically driven automatic tarper 300 comprising a hydraulic actuating assembly 310, the tarping bar 160 and the tarp 180. The hydraulic actuating assembly 310 includes a piston 320 with an operating end 350, a cylinder 330, and quick connectors 340A, 340B that connect the cylinder 330 to a hydraulic fluid reservoir. The operating end of the piston 350 attaches to the pivot end 164 of the side arm 162 and, depending on whether the piston 320 is being extended or retracted, forces the tarping bar 160 to the open or the closed position, respectively. The hydraulic piston and cylinder system is well known and is not described with any detail herein.

It is understood that the embodiments described herein are merely illustrative of the present invention. One skilled in the art may contemplate variations in the construction of the automatic tarper without limiting the intended scope of the invention herein disclosed and as defined by the following claims.

What is claimed is:

1. A tarping system for secure closure of a trash opening on a compactor receiver container (CRC), said trash opening being in a rear vertical panel of said CRC and being bounded by an upper edge, a lower edge, and side edges, said tarping system comprising:

a tarping bar having two side arms and a horizontal bar therebetween, each side arm being pivotably attached to said rear vertical panel;

a tarp having a first end and a second end, said first end being attached to said rear vertical panel around a lower portion of said trash opening and said second end being attached to said tarping bar;

an actuation means for moving said tarping bar between an open position in which said horizontal bar extends near to and substantially parallel to said lower edge and a closed position in which said horizontal bar extends near to and substantially parallel to said upper edge.

2. The tarping system of claim 1, wherein said lower portion of said trash opening includes lower side edges and a lower horizontal edge, and wherein said tarp includes a side panels and a main panel, wherein each side panel is attachable to said lower side edge and also to said side arm, and said main panel is attachable to said lower horizontal edge, so as to provide sufficient tarp area to allow said tarping bar to swing upward in a semicircular arc while said tarp is attached to said lower portion of said trash opening.

3. The tarping system of claim 1 further including two pivot pins that are mountable on said rear vertical panel, wherein each side arm of said two side arms has a pivot point and a pivot attachment end, said side arm being mounted on a corresponding one of said pivot pins, and wherein said actuation means is attachable to said pivot end of at least one of said side arms for pivoting said tarping bar about said two pivot pins.

4. The tarping system of claim 3, wherein said actuation means includes an actuator and a tension means that is attached to said pivot end of at least one of said side arms.

5. The system of claim 2, wherein said actuator includes a lever and a cable and said tension means is a biasing spring, wherein said cable is coupled at a first end to said lever and at a second end to said biasing spring, and wherein said lever is movable between a tensioning position and a tension-release position.

6. The system of claim 5, wherein said tension means further includes a tension bar, a swing bar, and a tension adjustment means for adjusting tension on said cable, wherein said lever is coupled to said tension bar, wherein said swing bar is coupled to said first end of said cable, and wherein said tension adjustment means is coupled between said swing bar and said cable.

7. The system of claim 6, wherein said tension means further includes a pulley around which said cable is guided.

8. The system of claim 3, further comprising a safety means for locking said tarping bar into a biased position.

9. The system of claim 8, wherein said safety means includes a lock bar that is mountable on said rear vertical panel and slides across said tarping bar, thereby securing said tarping bar into said biased position.

10. The system of claim 8, wherein said safety means includes at least one safety chain that is attached to said tarping bar and that is attachable to said CRC for securing said tarping bar in said open position or in said biased position.

11. The system of claim 1, wherein said actuation means is a power-assisted means that includes a a power unit that is attachable to said pivot end of at least one of said side arms and a power switch, wherein said power unit is actuatable to move said tarping bar between said open position and said closed position.

12. The system of claim 11, wherein said power unit is a hydraulic unit that includes a piston that is attachable to said pivot end.

13. The system of claim 11, wherein said power unit is an electric motor and a winch with a cable, wherein said cable is attachable to said pivot end.

* * * * *